Sept. 1, 1959   B. H. MATTHEWS   2,902,445
METHOD OF REGENERATING A ZEOLITE BED
Filed Dec. 20, 1956
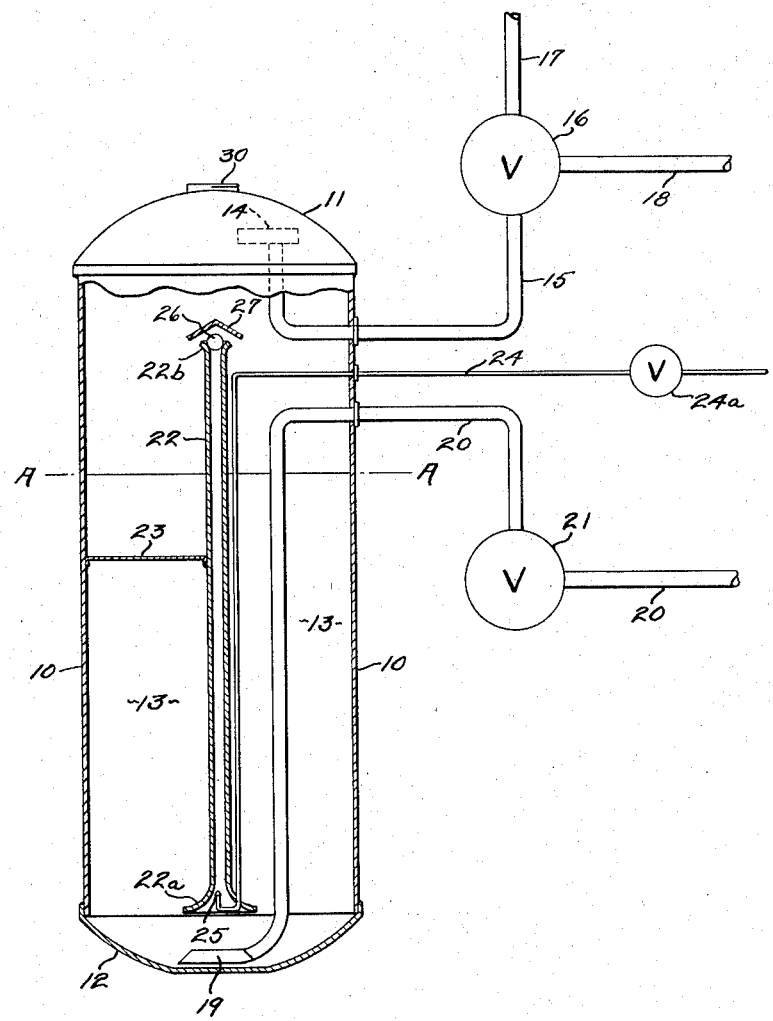
INVENTOR.
BENJAMIN H. MATTHEWS
BY
ATTORNEYS

United States Patent Office 2,902,445
Patented Sept. 1, 1959

2,902,445

METHOD OF REGENERATING A ZEOLITE BED

Benjamin H. Matthews, Lake Lucerne, Ohio

Application December 20, 1956, Serial No. 629,568

1 Claim. (Cl. 210—35)

This invention relates to improved water softening apparatus and to a new method of regenerating the zeolite bed contained therein.

An object of this invention is to provide an improved water softening apparatus which by-passes the hard water supply and continuously scrubs the zeolite bed by recirculating a salt brine solution during the regenerating period.

Another object of the present invention is to reduce the large volumes of water generally flowing upwardly through the zeolite bed during the regenerating period, as presently employed in most water softeners. The present invention requires only a small volume of water which by utilizing a jet stream action, causes large amounts of briny water to be recirculated within the apparatus and thereby scrub the zeolite bed.

Another object of the present invention is to completely regenerate the entire zeolite bed from one end to the other. In the past, salt has been introduced upon the top of the zeolite bed at a time when the bed is normally in an expanded condition, which allows the salt to penetrate into the bed. The normal procedure was to feed fresh water downwardly through the bed until the salt had been completely dissolved and washed out. The top of the zeolite bed, thus, never became regenerated. The present invention overcomes this problem by recirculating the briny solution through the entire depth of the zeolite bed.

Still another object of this invention is to eliminate the necessity of back-washing the zeolite bed with high volumes of water, sometimes not available in the case of domestic users.

Another object of the present invention is to provide an improved water softener characterized by its structural simplicity, the ease of assembly of its parts, its strong and sturdy nature and its low manufacturing cost. Other features of this invention reside in the arrangement and design of the parts of carrying out their appropriate functions.

Further objects of the present invention and certain practical advantages will be referred to in or will be evident in the following description of one embodiment of the invention, as illustrated in the accompanying drawings in which:

The drawing is a schematic arrangement of the preferred form of the apparatus for carrying out the present invention.

Before describing in detail the herein shown embodiment of the invention, it is to be understood that the present invention is not limited to the structural details or the particular arrangement of parts herein shown, as devices embodying the present invention may take other forms. It is also to be understood that the phraseology and terminology herein used are for purposes of description and not of limitation, as the scope of the present invention is denoted by the appended claim.

The normal practice of softening water by the use of zeolite is to employ a bed of zeolites in a filter casing. The hard water to be treated is passed through the zeolite bed containing sodium; the water percolates down through the zeolite bed and out of a lower manifold. After a period of time, the zeolites become exhausted and it becomes necessary to regenerate the bed. This process involves the introduction of salt or sodium chloride upon the top of the zeolite bed after which hard water is caused to flow over the salt and through the bed until the salt is completely dissolved and rinsed out. After the salt or briny solution has been washed out, the softening operation is again resumed. In some cases an intermediate step of backwashing the zeolite bed to remove mechanically separated impurities is also involved. The present invention is directed to improving the water softening apparatus and to providing a more efficient method of regenerating the zeolite bed.

Referring now to the drawing, a cylindrical casing 10 is provided with a conical cover 11 and bottom 12. The container has within it a bed of water softening material composed of granular zeolitic material 13 which fills the tank to the level designated by line A—A. Hard or raw water enters the tank through an upper manifold 14 which is connected to pipe 15. Pipe 15 leads to a three-way valve 16 which selectively controls both a hard water inlet pipe 17 and a drain pipe 18.

The lower end of the tank is provided with an outlet manifold 19 for the softened water. The manifold 19 is provided with a fine screen through which the zeolitic material will not pass but which permits free flow of the softened water. The manifold 19 is connected to a pipe 20 which may be considered the house line and is controlled by means of valve 21.

A vertical open-ended upstanding cylindrical tube 22 is suspended in the center of the zeolite bed by means of bracket 23 which is fastened to the inner wall of the casing. The tube 22 extends upwardly from a point just above the discharge manifold 19 to a zone well above the top of the zeolite bed but below the upper manifold 14. An inlet pipe 24 enters the casing 10 and terminates in a jet nozzle 25 which is disposed at the lower end of tube 22 and directed to discharge a jet of water upwardly into the flared lower end 22a of tube 22. The jet 25 is so located in the throat, where 22a joins 22, as to give an injector action. A valve 24a controls the flow through pipe 24. The upper end of cylindrical tube 22 is also provided with a flared portion 22b which provides a valve seat for a ball valve 26 which rests on said seat and controls the upper opening in the tube 22. It will be understood that the ball valve 26 permits upward flow only through the tube 22. A conical baffle member 27 is suitably secured to the inner walls of casing 10 (or attached to tube 22) a spaced distance above the upper end of tube 22 and serves the dual purpose of providing a cage for limiting the range of movement of the ball 26 and also deflecting the flow of water emerging from the upper end of tube 22 in a downward direction toward the zeolite bed 13. It will be understood that in normal water softening operation hard water enters through the upper manifold 14 via inlet pipe 17, valve 16 and pipe 15 and works its way down through the zeolite bed 13 and then is discharged through the lower manifold 19 and pipe 20 to the house. At such time, valve 16 is adjusted to close off the drainpipe 18. Valve 24a is also closed while valve 21 in pipeline 20 is open.

The steps incident to regenerating the zeolite bed are initiated, operated and controlled in the following manner:

When the regeneration is to occur, valve 16 is so adjusted as to shut off the hard water inlet pipe 17 and to connect the drain pipe 18 with pipe 15 and the inlet manifold 14 at the top of the casing 10. Valve 21 controlling the flow through the house line is closed. A removable cap 30 provided at the top of casing 10 is then opened and salt or sodium chloride placed upon the top of the zeolite bed 13. At this point, it will be understood that no hard water is entering the casing. In addition, the lower discharge manifold 19 and pipe 20 are closed by means of valve 21. The only exit from the casing is through the upper manifold 14, line 15 and drain line 18. Valve 24a is then opened a small amount to permit a flow of water of from approximately one-half gallon per minute to one gallon per minute through the line 24 to the nozzle 25. The nozzle 25 acts as an injector which discharges a jet of water upwardly into the tube 22. The water passing from nozzle 25 flows at a high velocity upwardly through the tube 22 and causes the water then contained within the tank to be recirculated. The tube 22 thus acts as a transfer tube carrying the water from the bottom of the casing upwardly. In actual tests, I have found that this jet action causes about six times as much water to circulate up through the tube 22 as the volume flowing in line 24. During this regeneration, the excess water entering through the jet 25 is taken out through the upper manifold 14, pipe line 15, valve 16 to the drain pipe 18. The water passing up through the tube 22 carries with it zeolite from the bottom of the zeolite bed 13. The force of the water lifts the ball valve 26 and permits the water and zeolite to egress from the upper end of the tube where it immediately strikes the baffle member 27 and is directed in a downward direction upon the top of the zeolite bed. Thus, the zeolite mineral is carried from the lower end of the container and deposited on the top layer of the bed 13. It will be understood that as the water is continually recirculated upwardly through the tube 22 and downwardly through the zeolite bed 13 it dissolves the salt and becomes a very briny solution. The zeolite material is cleaned and scrubbed by the briny solution as it goes up through the central tube 22. It will be noted that the induced flow up through the tube 22 must be circulated down through the zeolite bed causing the bed to regenerate in a down flow or normal water softening direction; experience indicates a very high recovery rate under such conditions.

It will be understood that during the regenerating process the casing fills up with water to the level of manifold 14 by which any excess water flowing through line 24 will be removed. The excess water thus removed also carries with it the briny solution and other sediments contained within the casing 10.

After the zeolitic material has been thoroughly regenerated and all of the briny solution removed from the casing, the apparatus is returned to its initial water softening position. The hard or raw water pipe 17 is then opened and the drain pipe 18 closed by means of valve 16. Valve 24a, feeding the nozzle 25 is closed while valve 21 permitting flow through the house pipe 20 is opened. It will be noted that the ball check valve 26 at the upper end of the tube 22 prevents the raw or hard water during the water softening cycle from following the path of least resistance which would be down through the tube 22 to the lower manifold 19 thereby by-passing the zeolite bed.

In view of the foregoing description, taken in conjunction with the accompanying drawings, it is believed that a clear understanding of the construction, operation and advantages of the device will be quite apparent to those skilled in this art.

Having thus described my invention and illustrated its use, what I claim is new and desire to secure by Letters Patent is:

The method of regenerating a zeolite bed in a water-softening tank wherein the flow of water to be softened is from top to bottom through said zeolite bed, including the steps of closing off all inlet and outlets in said tank with the exception of a drain located near the top of said apparatus, placing a water-soluble regenerating agent on top of said zeolite bed, introducing a jet water into the bottom of a central tube which extends vertically through said zeolite bed in a manner to aspirate the water remaining in the apparatus and entrained zeolite upwardly through said tube after which the water and zeolite move downwardly through said tank, and continually removing by means of said drain any excess water introduced by said jet.

References Cited in the file of this patent

UNITED STATES PATENTS

| 1,608,661 | Nordell | Nov. 30, 1926 |
| 1,903,612 | Dotterweich | Apr. 11, 1933 |
| 2,365,293 | Robinson | Dec. 19, 1944 |

FOREIGN PATENTS

| 290,373 | Germany | Apr. 26, 1914 |
| 311,900 | Germany | Apr. 26, 1919 |
| 721,643 | Germany | June 12, 1942 |
| 770,225 | France | June 25, 1934 |
| 34,904 | Denmark | Aug. 24, 1925 |